United States Patent
Liteplo et al.

(10) Patent No.: US 6,782,305 B2
(45) Date of Patent: Aug. 24, 2004

(54) METHOD OF GEOMETRIC INFORMATION SHARING AND PARAMETRIC CONSISTENCY MAINTENANCE IN A COLLABORATIVE DESIGN ENVIRONMENT

(75) Inventors: William Liteplo, Cambridge, MA (US); David Wallace, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/968,684

(22) Filed: Oct. 1, 2001

(65) Prior Publication Data
US 2003/0065413 A1 Apr. 3, 2003

(51) Int. Cl.[7] ............................................. G06F 19/00
(52) U.S. Cl. ....................... 700/182; 700/105; 700/183; 345/964
(58) Field of Search ................................ 700/103, 105, 700/182, 183; 345/418, 420, 441, 964

(56) References Cited

U.S. PATENT DOCUMENTS 5,819,062 A * 10/1998 Srikantappa ................. 716/11
5,911,074 A * 6/1999 Leprince et al. ............ 717/100
6,445,974 B1 * 9/2002 Malaugh et al. ............ 700/182

* cited by examiner

Primary Examiner—Jayprakash N. Gandhi
(74) Attorney, Agent, or Firm—Daly, Crowley & Mofford, LLP

(57) ABSTRACT

A method for sharing geometric information and maintaining parametric consistency amongst different software applications in a collaborative environment is presented. The method is based on geometric information sharing via neutral files, and incorporates Internet based messaging mechanisms amongst applications to maintain the parametric control over the exchanged geometry. In a preferred embodiment the proposed method is applied to Heterogeneous Assembly Modeling (HAM). By means of the presently disclosed method, within the heterogeneous assembly model, the parametric control over part geometry is maintained, even though the parts are imported in the assembly via neutral files originated by other CAD applications.

9 Claims, 16 Drawing Sheets

METHOD OF GEOMETRIC INFORMATION SHARING AND PARAMETRIC CONSISTENCY MAINTENANCE IN A COLLABORATIVE DESIGN ENVIRONMENT

FIELD OF THE INVENTION

The present invention relates generally to sharing files amongst many users and more specifically to sharing geometric information and maintaining parametric consistency among elements in different software applications in a collaborative environment.

BACKGROUND OF THE INVENTION

As is known in the art, there is a trend in the development of products having multiple components or subsystems to outsource the complete design of a component or an entire subsystem. In such a product development effort, therefore, different companies are designing different components or subsystems which must eventually be mechanically mated as assemblies to provide the final product.

As is also known, a product development effort typically requires multiple re-designs of each component prior to selecting a final product design. In the case where two or more components must be mated together, a mechanical or geometric change to one of the components may affect the ability of that component to mate with the other components. It may be necessary to change the other components so that all of the components are mechanically compatible. Thus, in this instance, a change to the geometry of one component can cause other components to change. This raises the problem of sharing design information between the different companies designing each of the components.

As is also known, design companies (referred to herein as suppliers since they are supplying a design) typically utilize Computer Aided Design (CAD), Computer Aided Manufacturing (CAM), Computer Aided Engineering (CAE), etc. software applications. When designing components and/or subsystems. Different companies often have different types of CAD, CAM, CAE and such applications are typically not compatible i.e. it is not possible to directly share parametrically editable data between the different software applications at the different companies and other software applications. Thus, when multiple companies are designing different components or subsystems, it can become relatively difficult, time consuming and burdensome to share information and maintain consistency during a re-design process.

Within large organizations such as automobile manufacturers, for example, a common approach for resolving interoperability issues has been to standardize the design process on a single CAD package. This makes it easier to share native CAD models with dedicated CAM and CAE packages. Assembly modeling is homogenous, since all the parts are coming in the same CAD format, and thus parametric control on the parts can be maintained within the assembly model. However, this strategy also has negative consequences. From a supplier viewpoint, it may require the adoption of new tools that may not best suit their design needs, and they are required to reveal native models to other suppliers or the Original Equipment Manufacturer (OEM), such native models may contain design history that may be proprietary to the supplier. From the OEM viewpoint, flexible competition amongst potential suppliers is restricted to those using the standardized tool set.

An alternative strategy relies upon the exchange of component and subsystem geometry between organizations through the use of neutral files. Initial Graphics Exchange Specification (IGES) is a neutral file format originated by the National Institute of Standards and Technology (NIST) and adopted by the American National Standards Institute (ANSI) to facilitate transfer of geometric data. In practice, IGES has become the standard in CAD/CAM data exchange in the U.S.

The International Organization for Standardization (ISO) has developed its own neutral file format commonly known as STEP (Standard for the Exchange of Product Model Data, standard number ISO-10303-21). The standard itself is more than a geometric description format, attempting to incorporate a complete definition of the physical and functional characteristics of a product across its entire life cycle, including design, manufacture and support. Application Protocols (APs) define subsets of the STEP standard. The AP most relevant to geometry (AP 203) is recognized by most major CAD and CAM systems, and is compatible with the Product Data Management (PDM) standards. Although parametric relations are not defined within AP 203, data translation tends to be more robust and require less rework than IGES files. STEP is now used internationally, particularly in the aerospace and defense sectors.

STEP and IGES are the most robust and accepted standards for transferring geometry between CAD systems. AutoCAD's DXF (Data exchange Format) files have limited application and are not recognized as an official standard. VRML (Virtual Reality Modeling Language) is useful for visualization, but is not commonly used for importing geometry back into CAD systems. Similarly, STL (Standard Triangulated Language) files are appropriate for providing data to rapid prototyping devices, but do convert well between CAD systems. Although neutral files are not perfect, their relatively high level of functionality, ease of use, and acceptance by industry make them desirable as a means of transferring geometry between software applications, and in particular between CAD systems.

However, in a collaborative environment, the use of neutral files raises some issues related to content mapping, and to consistency maintenance of collections of elements. Content mapping is about associating the right low-level parametric geometric information within the neutral file, to the hi-level information as needed to maintain parametric consistency within the application or applications which uses the neutral file as a source of geometry. E.g. map the machined surface as represented within a CAM application to a specific surface stored in the neutral file. E.g. in assembly modeling, map the surfaces as defined in an assembly relation (e,g, a mating) to the right entities in the neutral file, or that the diameter of a bolt should match the diameter of a hole. Unless some automatic semantic interpretation capabilities are implemented within the application, content mapping is usually performed manually.

Consistency maintenance is about making sure that all the participants see an updated copy of the neutral file any time a change in the original native geometry has occurred. Geometry modifications can be classified as parametric changes to the model dimensions, or as changes to the model topology. Neither one is currently supported by any neutral file format. Changes to the topology (e.g. add/remove features) constitute a very hard problem for information sharing, and neutral file-based approaches are no exception to this.

Parametric changes are readily handled as long as they do not imply content re-mapping. Unfortunately, neutral file formats do not currently support parametric geometry, thus a new neutral representation is generated each time a parametric change occurs in the source geometry.

Manual generation and dissemination of updated neutral files is a viable option only for collaborative activities where geometric modifications are rare and easy-to-track events. Unfortunately this is not the case for most collaborative activities, thus the process needs to be automated to achieve a robust consistency control. Furthermore, the classical software architecture involving geometric information exchanges via neutral files allows only for parametric modifications driven by the original application that generated the geometric model. This unidirectional control flow is too limited for most collaborative environments: the capability of driving parametric geometry might be regarded as a valuable feature for the client applications that access the geometry through neutral files.

These considerations can be reformulated from the H-CAD (heterogenous CAD) viewpoint. Consider a heterogeneous assembly model built up from parts coming via neutral files created by different CAD applications. The proper mappings have been established to associate the assembly relations to the entities imported via neutral files, and only parametric changes to the part dimensions are allowed.

As any parametric change is performed to a part geometry, by any one of the part suppliers, new, up-to-date, neutral files are generated and sent over to the client application (the assembly modeler). Also, the latter must be notified to regenerate the overall assembly. If many changes like this one occur (which is common practice when exploring design alternatives), the risk of consistency loss is very high as there are many inter-relationships between elements and many neutral files to keep track of. Furthermore, in a traditional architecture based on neutral files, parametric changes can only be performed by the part designers. There is no way for the CAD assembly operator(s) to drive the parametric part geometry by himself or herself.

Each participant models a part, or subassembly, using its own CAD tools. In addition to exporting the resulting part geometry in the form of a neutral file, the participant provides (publishes) an Internet-enabled interface to allow remote users to drive a predefined set of parameters of his local model. The participant thus becomes an internet-enabled part server. The remote user, the client application, locates these services in a service marketplace and subscribes to them. Upon subscription, the client application receives a first copy of the geometry via a neutral file. As the client application needs to perform a parametric change to the imported geometry, it issues a parameter change request to the part server, through the services it had subscribed to. In response to the parameter change request the server recalculates its internal geometric model and sends back an updated copy of the neutral file.

The exchange of component and subsystem geometries between different CAD systems through the use of neutral files is referred to as a Heterogenous Assembly Modeling (HAM) process since different file formats are converted to the neutral file format. This approach is increasingly reliable, and overcomes the negative characteristics of tool standardization: allowing different organizations to use different tools; and protecting proprietary knowledge embedded within design history. However, one drawback of this approach consists in the loss of parametric control (i.e., the client using the neutral files cannot make parameter changes, such as dimension changes, to the native subsustystem CAD models maintained by suppliers. For example, in a HAM environment, the parametric control over the parts is lost as the parts are imported to the heterogeneous assembly via the neutral files.

In a collaborative environment, where many design variations are generated and evaluated, this drawback can reduce design flexibility and lead to slow component, subsystem and product iteration cycles between suppliers and the OEM. Some organizations are attempting to address this limitation by having suppliers provide discrete variations, but even so the inherent limitation remains.

Within the scope of designing assembled products, the problem of sharing product model geometric information is of fundamental importance not only for hybrid assembly modeling, but also for integrating assembly product modeling applications with assembly process modeling applications, such as CAAP (computer-aided Assembly Planning) applications. The reconstruction of assembly product geometry within process planning applications (a.k.a. virtual assemblies) can be of great help to manufacturing engineers to evaluate, determine, and select assembly operations, generate assembly/disassembly process plans, and visualize the results.

One approach to fulfill geometry information sharing needs is to incorporate all the information needed by different applications into a single, unified representation. For example, in the assembly field, some researchers feel that CAD system representations for assembled products should incorporate process data (i.e. assembly sequences) along with product data, and eventually CAE related data as well. However, most of the currently available CAD packages store assembly product information only in terms of product geometry, without incorporating process or CAE models, specifically, without incorporating information about the assembly process.

Another approach consists in defining geometric representations of the product which are suitable to be exchanged among applications, so that each application is provided with meaningful data to accomplish its task. Still other prior approaches have included interfacing assembly process modeling tools with CAD systems through neutral file-based and distributed object feature based techniques, or using Virtual Reality Modeling Language (VRML) or other neutral files to create virtual assembly environments.

Large product development firms have favored tool standardization to minimize information exchange problems. This centralized data management directive must come from a relatively dominant OEM. Automobile manufacturers are a good example of companies that typically use this strategy. However, as most supplier companies are also highly invested in their own CAD/CAM software, this forced standardization is often costly, unpopular, and creates barriers to the consideration of different suppliers.

It would, therefore, be desirable to provide a method of sharing and updating geometric information among different software applications in a collaborative environment, and to provide such a method such that it is usable by a large number of people at minimal cost and training.

SUMMARY OF THE INVENTION

A method for sharing geometric information amongst different software applications in a collaborative environment is presented. The method is based on geometric information sharing via neutral files, and incorporates Internet based messaging mechanisms amongst applications to maintain the parametric control over the exchanged geometry. In a preferred embodiment the proposed method is applied to Heterogeneous Assembly Modeling (HAM) system. By means of the presently disclosed method, within the heterogeneous assembly model, the parametric control over part geometry or assembly is maintained, even though the parts are imported in the assembly(ies) via neutral files originated by other CAD applications.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
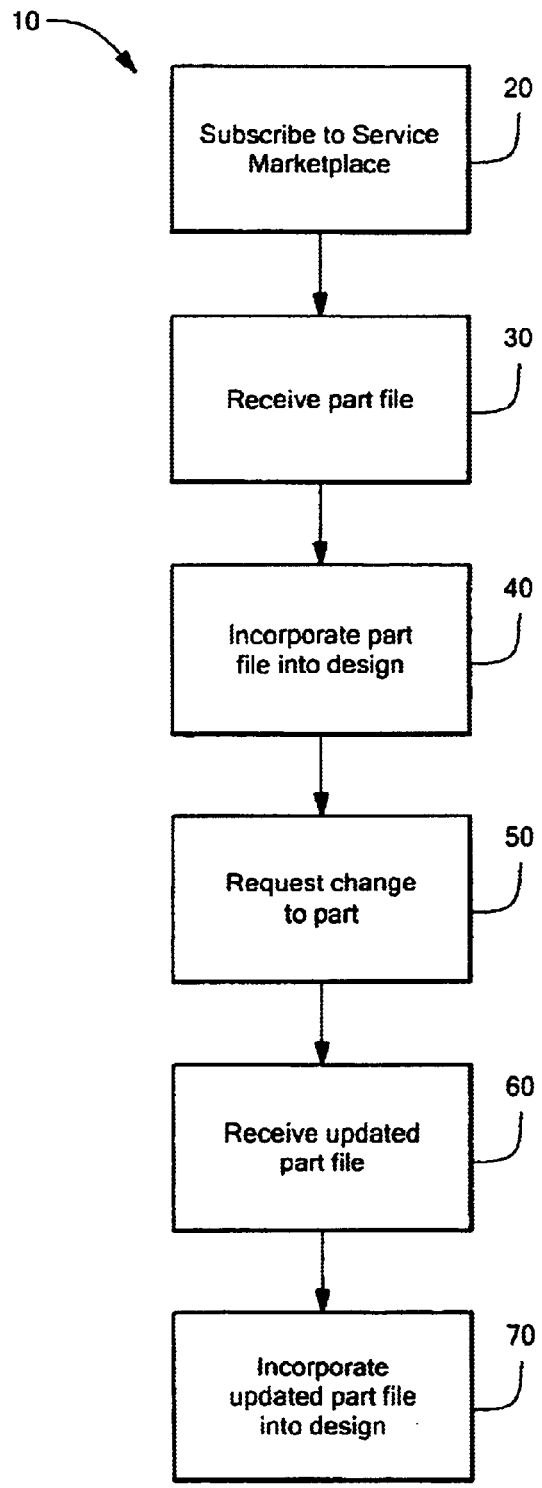
FIG. 1 is a flow chart of the presently disclosed method.

Referring now to FIGS. 1–16, the present invention is disclosed. FIG. 1 is a flow chart of the present method. The rectangular elements, are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required to operate a distributed Raman amplifier in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 2:
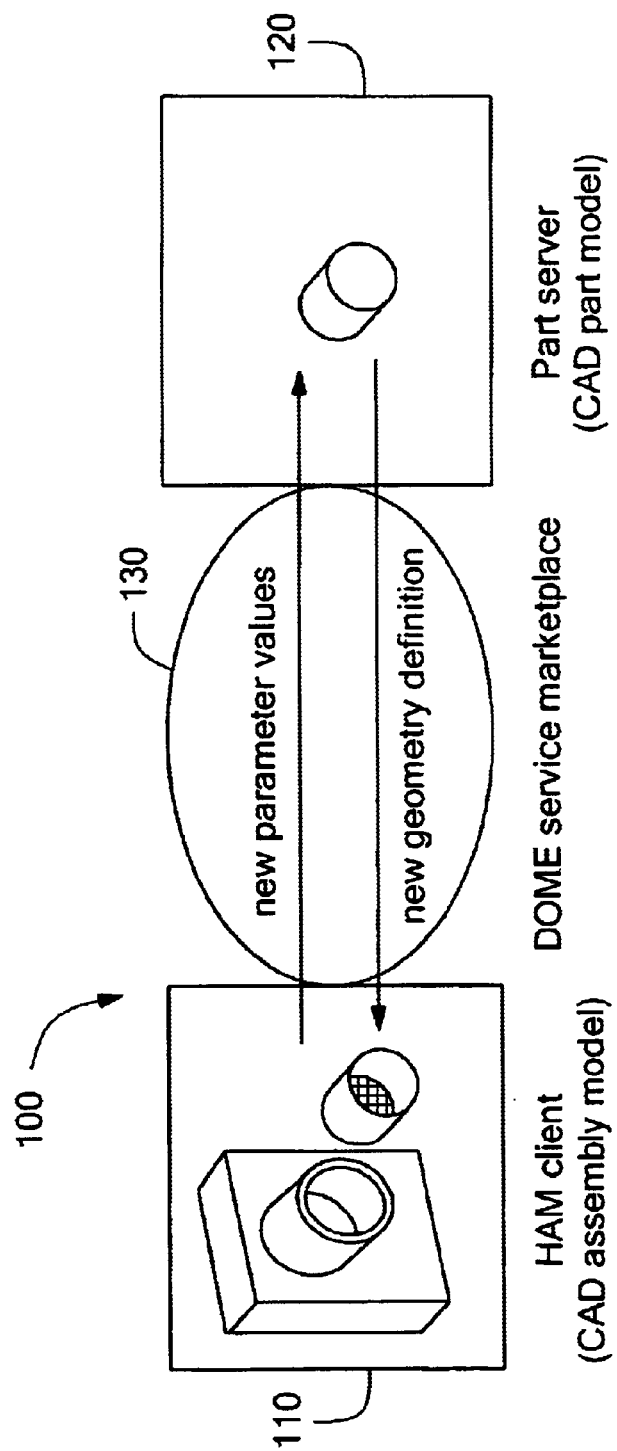
FIG. 2 is a diagram of the service marketplace.
Figure 3:
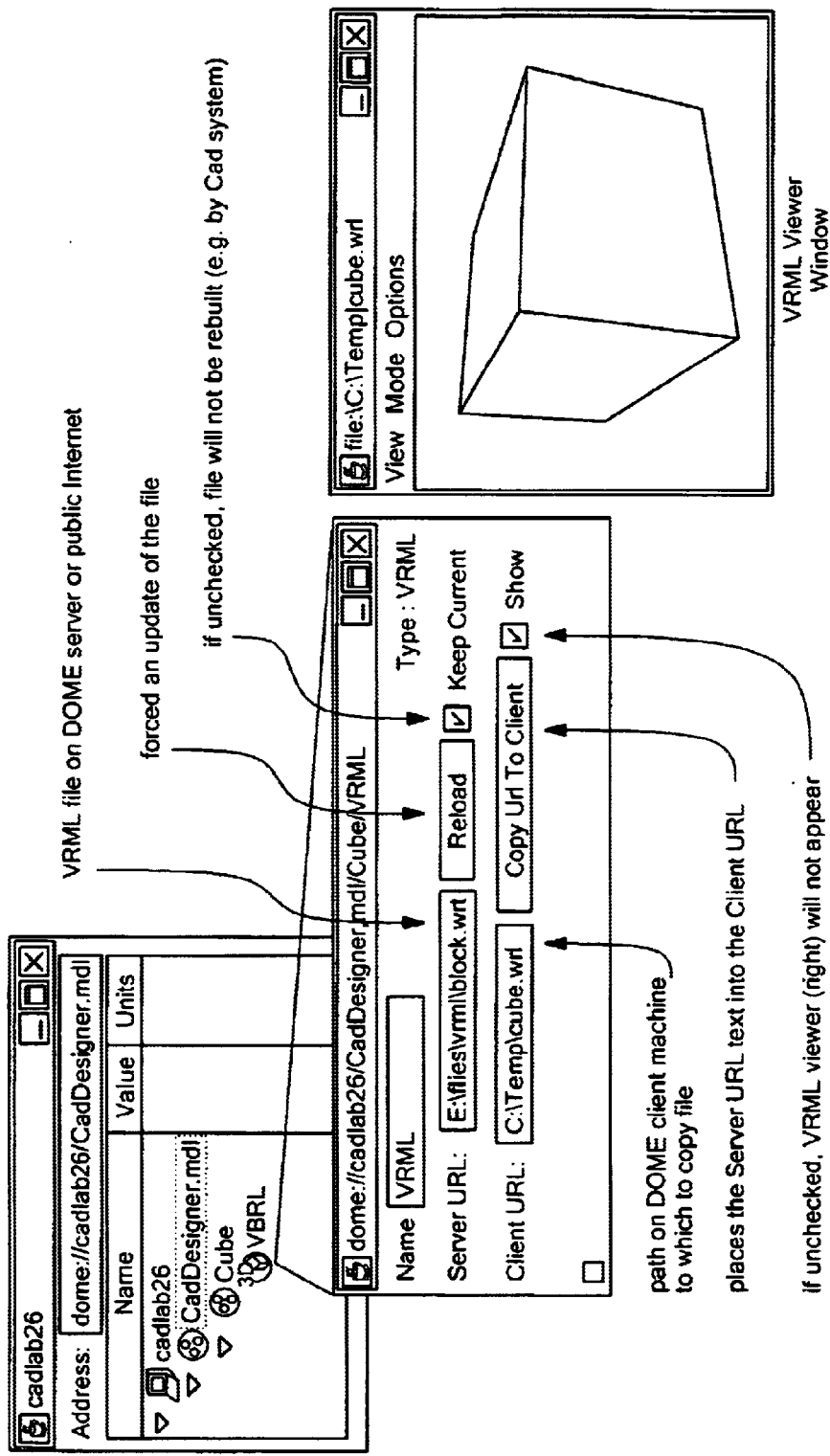
FIG. 3 is a screen shot showing the dome object model.

An environment 100 for the presently disclosed method is shown in FIG. 2. A HAM client 110 comprises an assembly engineer who is incorporating a part from a part server 120. The part server has files which contain detailed information relating to a part, such as physical characteristics. A service marketplace 130 is where the HAM client locates and select part servers. A software framework maintains the service marketplace and helps establishing and maintaining the connections deriving upon service subscriptions. The method now favored by the CAD industry is to use neutral file formats. Translators are developed between every application and a neutral file type. Accordingly, CAD files from any supporting software package can be exported to this neutral format, and imported into another system.

A simulation service marketplace concept called DOME (Distributed Object-based Modeling Environment) is used as a basis for the proposed geometric assembly modeling method, however other systems that provide similar functionality might be used to enable the method. In the simulation service marketplace, participants offer their simulation capabilities through service interfaces instantiated by object models accessible over a network such as the internet. Participants can define local relationships between their simulation services and the services of other simulations. Ultimately, the resultant service exchange network becomes an emergent distributed system model with service state changes propagating through the network to predict the integrated behavior of a design alternative.

The building block of the design simulation marketplace is the service-object. Service-objects manage a type of information or data. They are responsible for data persistence, versioning, documentation/self-description, access privileges, distributed communication through an aliasing mechanism, maintaining a list of subscribers, maintaining local constraints, providing change notification, providing quality or performance information, and providing appropriate mathematical operators for data manipulation. Additionally, they provide a graphical user interface (GUI) so design participants can visualize and interact with the service's data over the Internet.

The most basic classes of services correspond to different data types. Examples include service-objects for: scalar numeric quantities such as real numbers, complex numbers, integers, or probability distributions; vectors and matrices; functions such as piecewise, polynomial, or preferences (used in decision support); logical boolean; string; and file services such as VRML, XML, JPEG, ASCII, STEP, or IGES. Service-objects called containers also allow models in third party software to be wrapped with interfaces constructed of the basic DOME data type objects.

Relation objects are used to define functional interactions between any service-objects within a DOME model. A directed graph relation object manages the relationship definition, and has services as inputs and outputs. Inputs are services to which the relation subscribes, and output services in turn subscribe to the relation. When a relation is notified that its input services have changed, it will access the input service data, execute its relationship definition, and then notify the output services so that they can update their data newly provided by the relation.

The method of sharing geometric information in a collaborative design environment between a designer (also referred to as an engineer) and at least one part provider includes several steps. The first step is for the designer and at least one part provider to subscribe to a service marketplace. Referring back to FIG. 1, at the first step 20 the HAM client subscribes to the services of a remote part provider application (part server). A DOME object model provides access to, and visualization of, a VRML file. The DOME object model will be described below in conjunction with FIG. 3. The model owner has logged into a DOME server using a web browser. Within this engineer's workspace they have created an object model called cube. A VRML object has been added and the engineer has used its GUI to map it to a VRML file on the DOME server. Thus, when any client on the Internet with appropriate access privileges logs into the engineer's DOME server, they can visualize the cube using the services of the VRML object.

Figure 4:
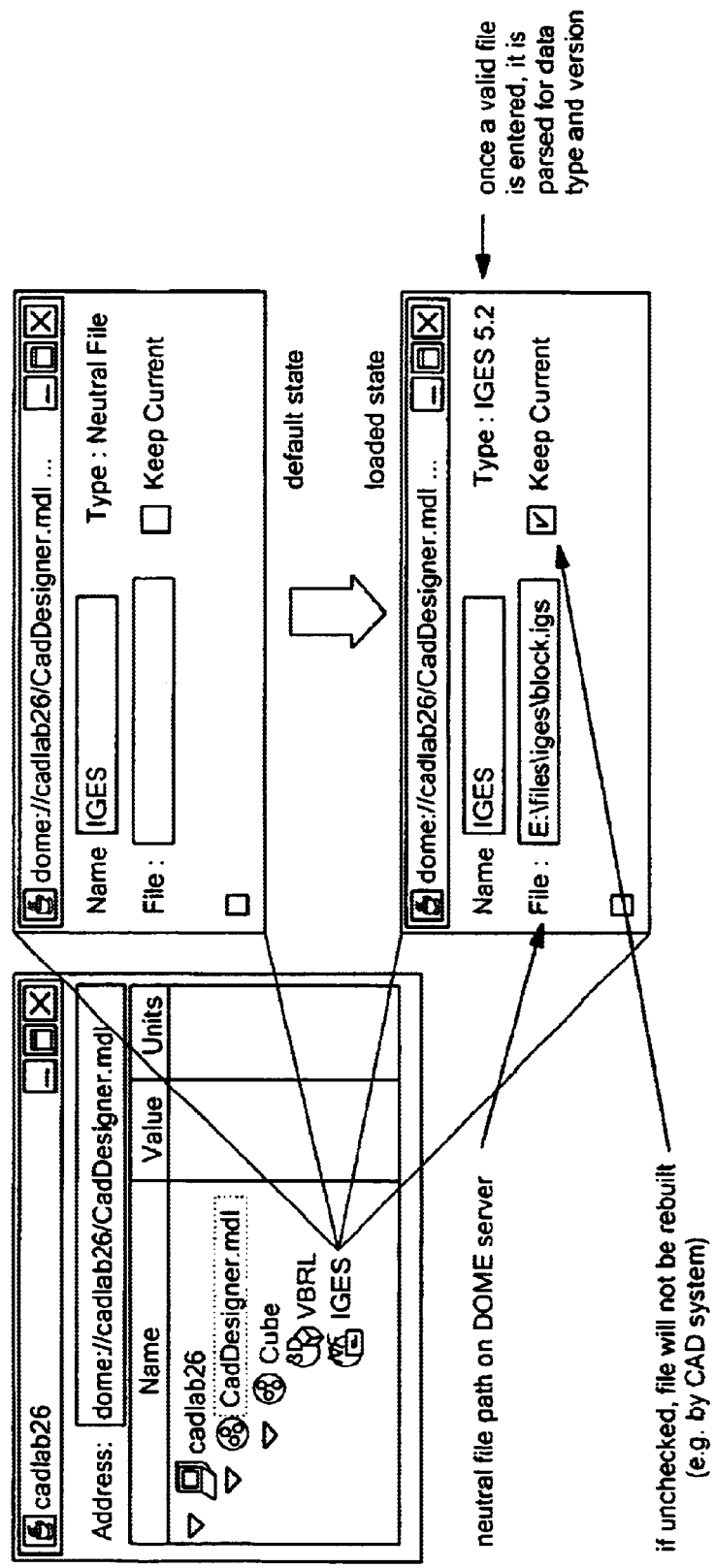
FIG. 4 is a screen shot showing the model with a neutral file object.

The next step of the method is step 20 wherein the part server sends the geometry information (peg) via a neutral file and the HAM client incorporates it into its assembly model. The designer receives a part file from one of the part providers, the part file containing information relating to the part. The part file is provided in a neutral file format from the provider service marketplace model, the provider service marketplace model having received data from a CAD model and having translated the CAD model data into the neutral file format. The designer incorporates the part file into the design. Incorporating the part file into the design includes receiving the part file at the designer service marketplace model and providing the part information to a designer CAD model. For example, as shown in FIG. 4, the engineer has added a neutral file object to their model. The figure shows the process for mapping the GUI to a neutral file on the DOME server machine. The current implementation is object compatible with all IGES versions, STEP AP203, and STEP AP214 (Core Data for Automotive Mechanical Design Processes).

On a separate DOME server a system integrator has created their own DOME model. They have also added a neutral file object to their model, and mapped it to a file on their own computer. The system integrator would like the engineer to provide them with the cube geometry in a neutral file format.

Figure 5:
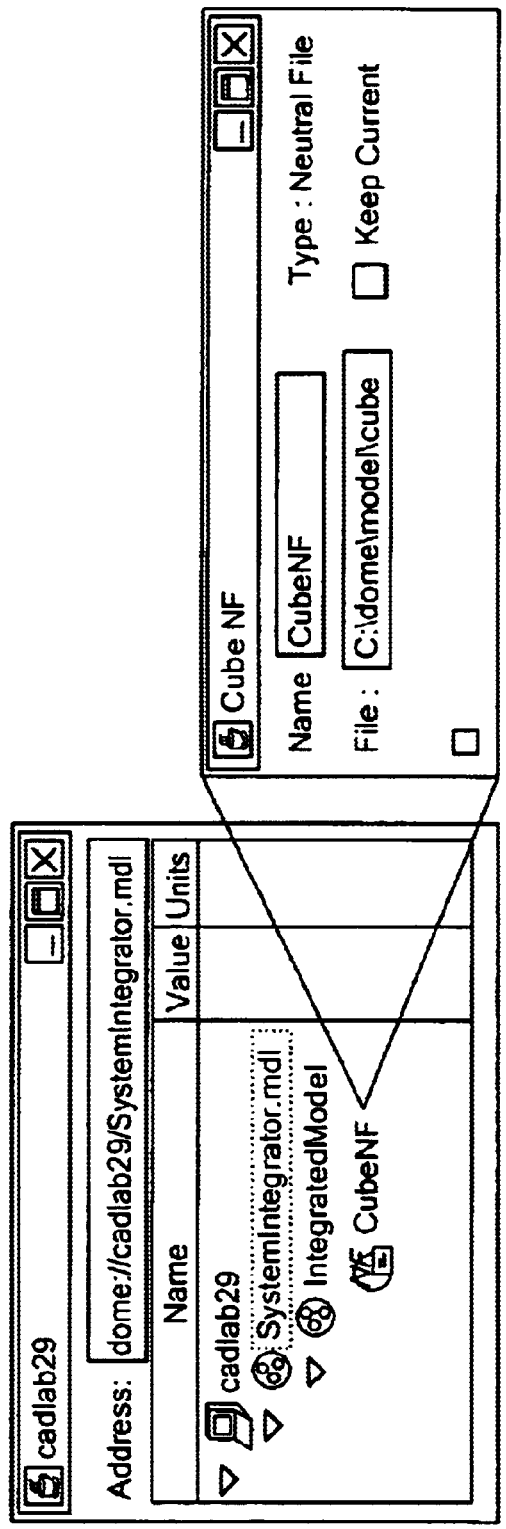
FIG. 5 is a screen show showing the engineer's model.
Figure 6:
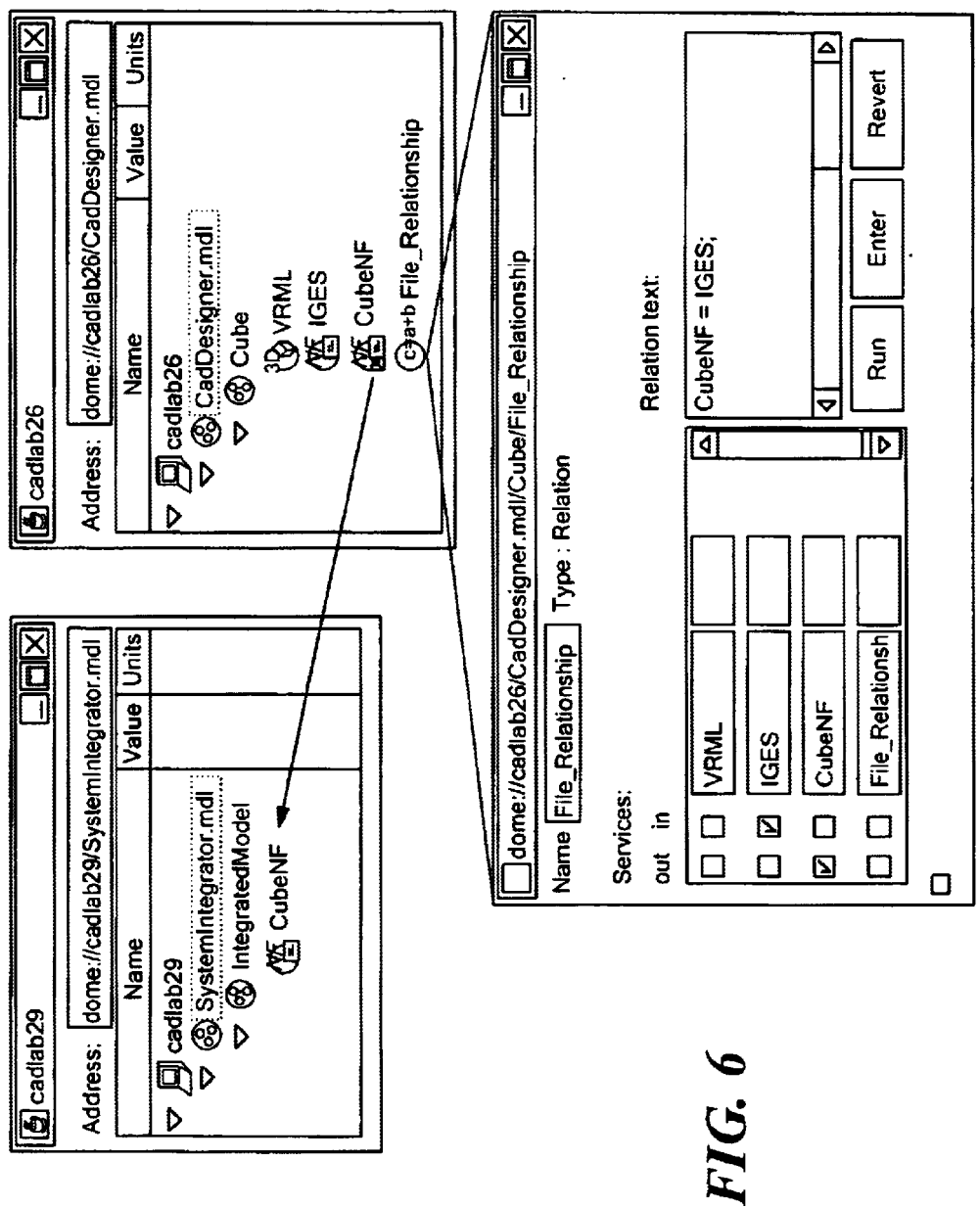
FIG. 6 is a screen shot showing the engineers neutral file object.

In FIGS. 5 and 6 the engineer has logged into the integrator's model, copied the integrator's neutral file object, and pasted an alias reference to it in their own DOME model. The engineer has added a relation object to their model, and indicated that that integrator's neutral file should be mirror (or equal) their own neutral file. Thus, whenever the engineer's neutral file changes, the relation will fire and the engineer's neutral file object will send its contents to the system integrator's neutral file object. Thus, the system integrator will always have a current version of the cube neutral file. All distributed communication mechanisms are handled transparently by the DOME objects. This alias functionality can be provided by all DOME objects.

The relation object defines the neutral file object IGES to drive changes to CubeNF in the Designer's model. This service-object is a reference to the object of the same name in the System Integrator's model.

The last element of enabling technology needed for the assembly modeling concept are wrappers to provide DOME services directly from native CAD systems. DOME service-objects called containers allow models in third party software to be wrapped with interfaces constructed from arbitrary combinations of the basic DOME data type objects.

CAD wrappers need to provide DOME interfaces to dimensions, properties such as mass, or neutral files from any model constructed using a particular CAD system. This process is illustrated using a wrapper developed for SDRC I-deas.

Once a designer has created a model in the native CAD system, they can publish aspects of their model to the DOME environment. In the I-deas environment, this is accomplished by putting appropriate suffixes on the dimension or parts. To allow a change to a dimension to be initiated by the DOME environment the suffix_DOMEin is used, while_DOMEout is used to provide results to the DOME environment. In order to make part properties or neutral files available, the part name is similarly tagged, and then appropriate keywords are entered into a description text area.

Figure 7:
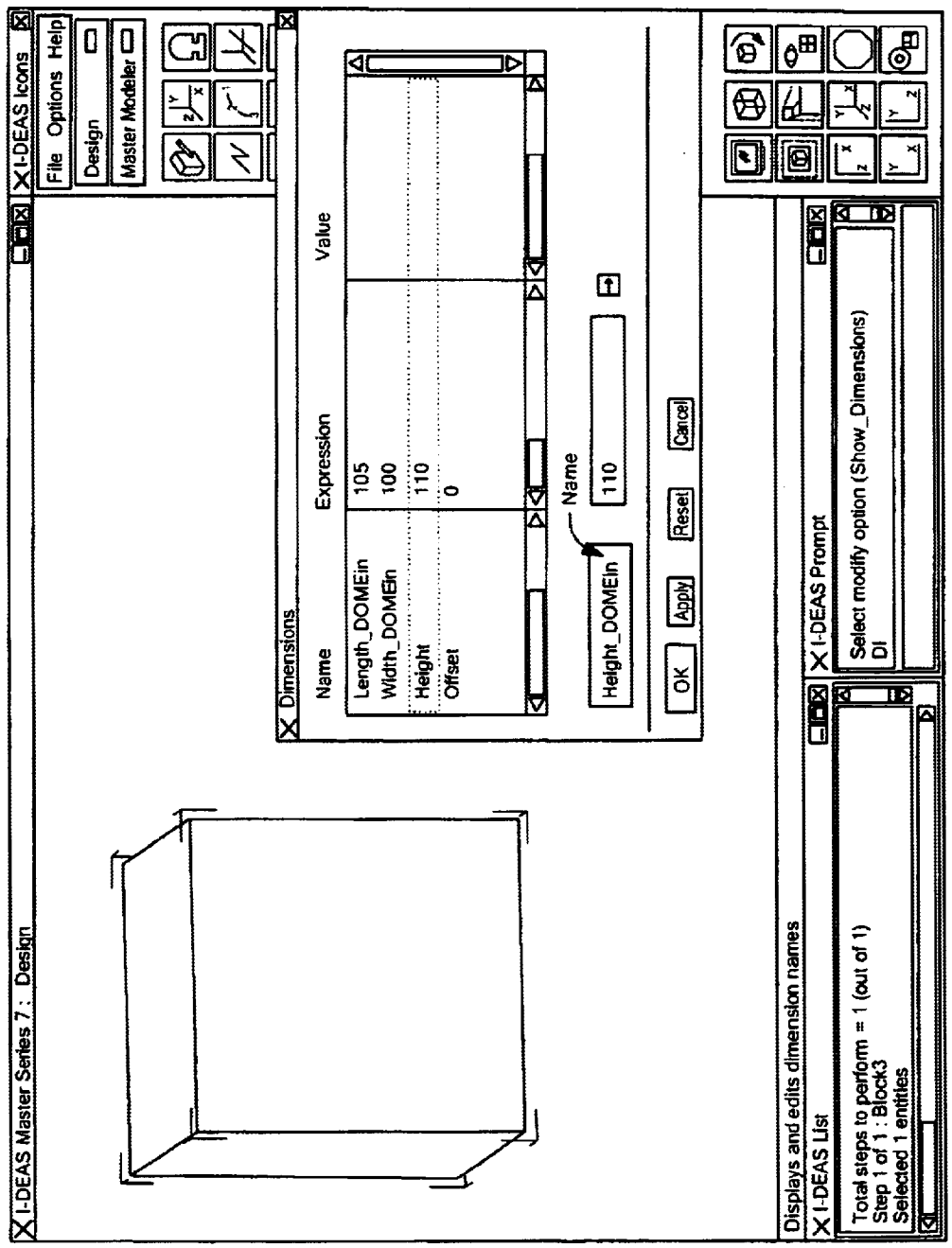
FIG. 7 is a screen shot of a part provider's model.
Figure 8:
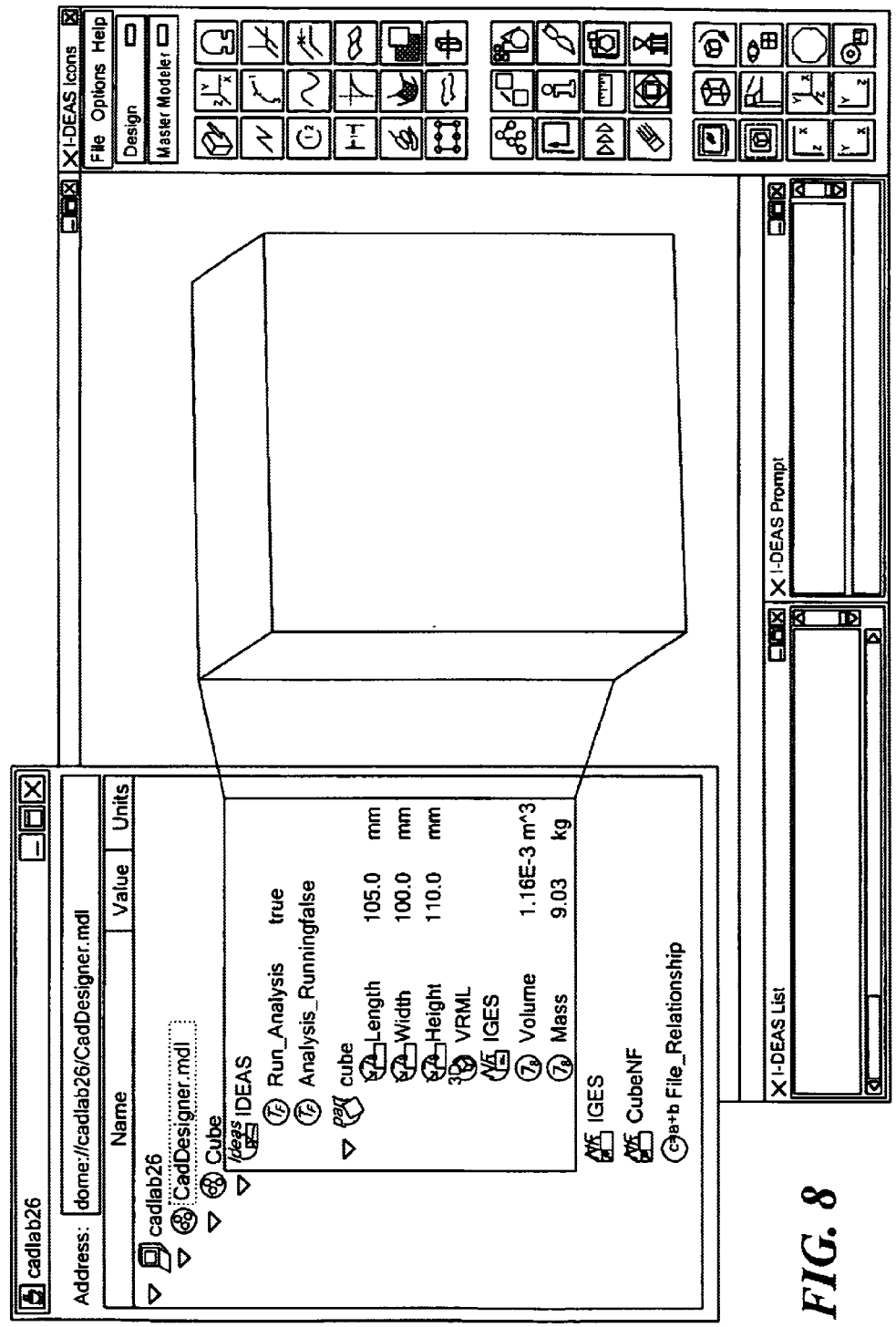
FIG. 8 is a screen shot of the part provider's dome server modeling area.

In FIG. 7 the CAD designer is defining a dimension of the cube model to be an input variable. Once the CAD designer has defined the model interface, only a few additional steps are required to instantiate the interface as services on a DOME server. In FIG. 8, the CAD designer has logged into a DOME server (cadlab26) and created a CADDesigner modeling area to work on their Cube model. Within this model they have added an I-deas wrapper object and specified the published CAD file. The wrapper object starts the CAD application, interrogates the CAD model, and automatically constructs appropriate interface objects in the DOME environment. In this case, the cube length, width, height, mass, volume, VRML and IGES files are been made available as services.

At step 50 anyone on the Internet with privileges to access the CAD designer's DOME server can now log into the server, and remotely change the length, width or height services of the cube model. The dimension changes are automatically propagated to the native CAD model, which rebuilds, and then sends new mass and volume properties, while VRML and IGES files back to the appropriate DOME objects as recited in step 60. As further depicted in FIG. 8, the relation listens for changes in the neutral file and then initiates its transfer to a neutral file service on a remote DOME server. Thus, through DOME, the assembly engineer can remotely drive the native CAD model, and receive new properties or observe the resulting geometry automatically.

Figure 9:
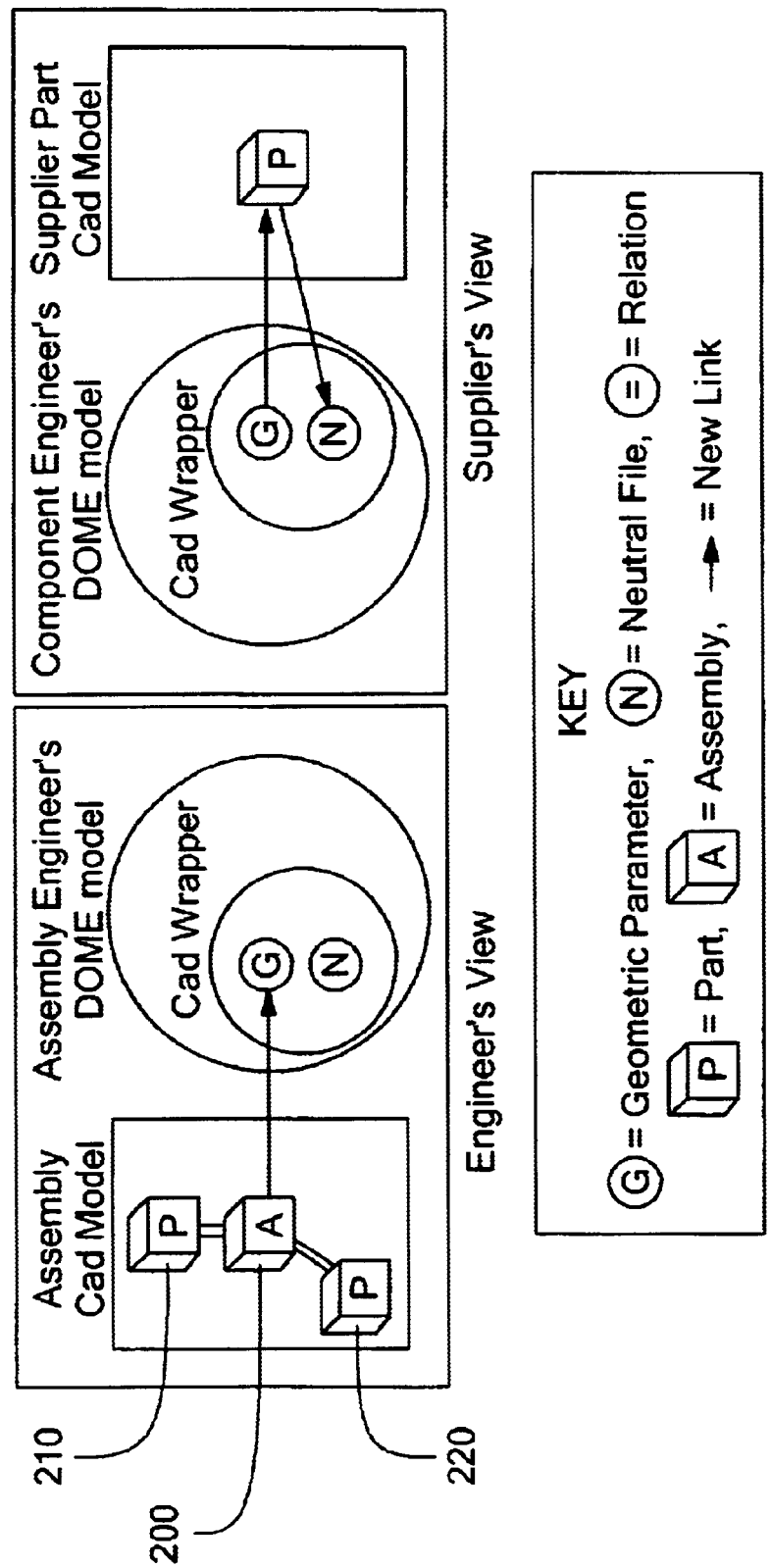
FIG. 9 is a diagram showing an engineer's assembly model.

The enabling technology has now been described sufficiently that the process for creating a geometric assembly can be illustrated through a particular example. An assembly engineer is responsible for building CAD models of an assembly system and analyzing it. While the engineer is responsible for a number of parts, certain components in the assembly are outsourced. In FIG. 9, the engineer has created an assembly model with two locally defined parts. They have published a DOME interface to the assembly, and also have an empty neutral file placeholder for the component to be provided by the outside supplier. Similarly, the component supplier has published a DOME interface to their own part model. Various dimensions are available as inputs, while VRML and neutral file descriptions are provided as outputs.

The engineer can log into the supplier's DOME model, change input dimensions that drive the supplier's underlying CAD model, and visualize the results using the published VRML service. Using aliases to dimensions in the supplier's DOME model, the engineer can define relationships so that dimensions from their own assembly model drive the supplier's component model.

Figure 10:
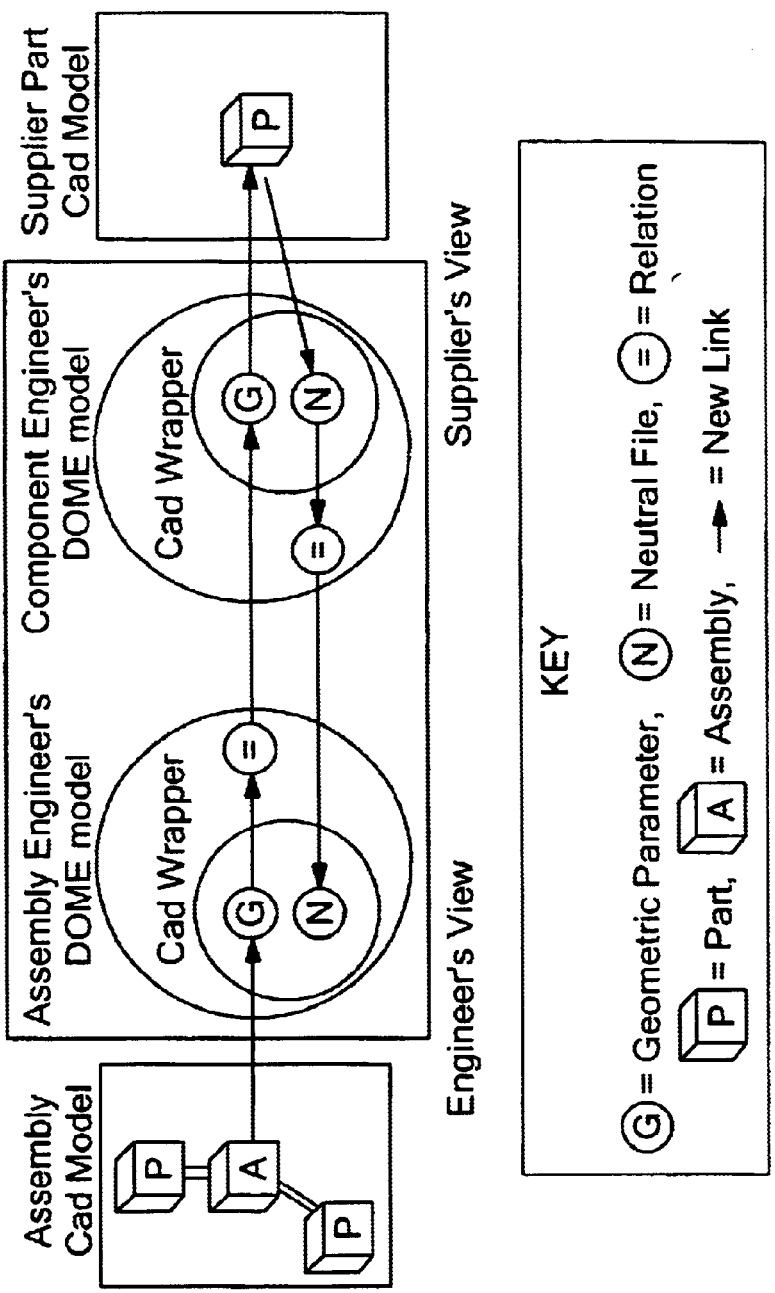
FIG. 10 is a diagram showing the models and the service marketplace.

Likewise, the supplier can log into the engineer's DOME server and make an alias to the neutral file input in the engineer's DOME model. Then, within their own DOME model, they can define a relationship so that the engineer's neutral file will automatically mirror the neutral file for the outsourced component as shown in FIG. 10. This can be done regardless of the CAD systems used by the two participants.

Figure 11:
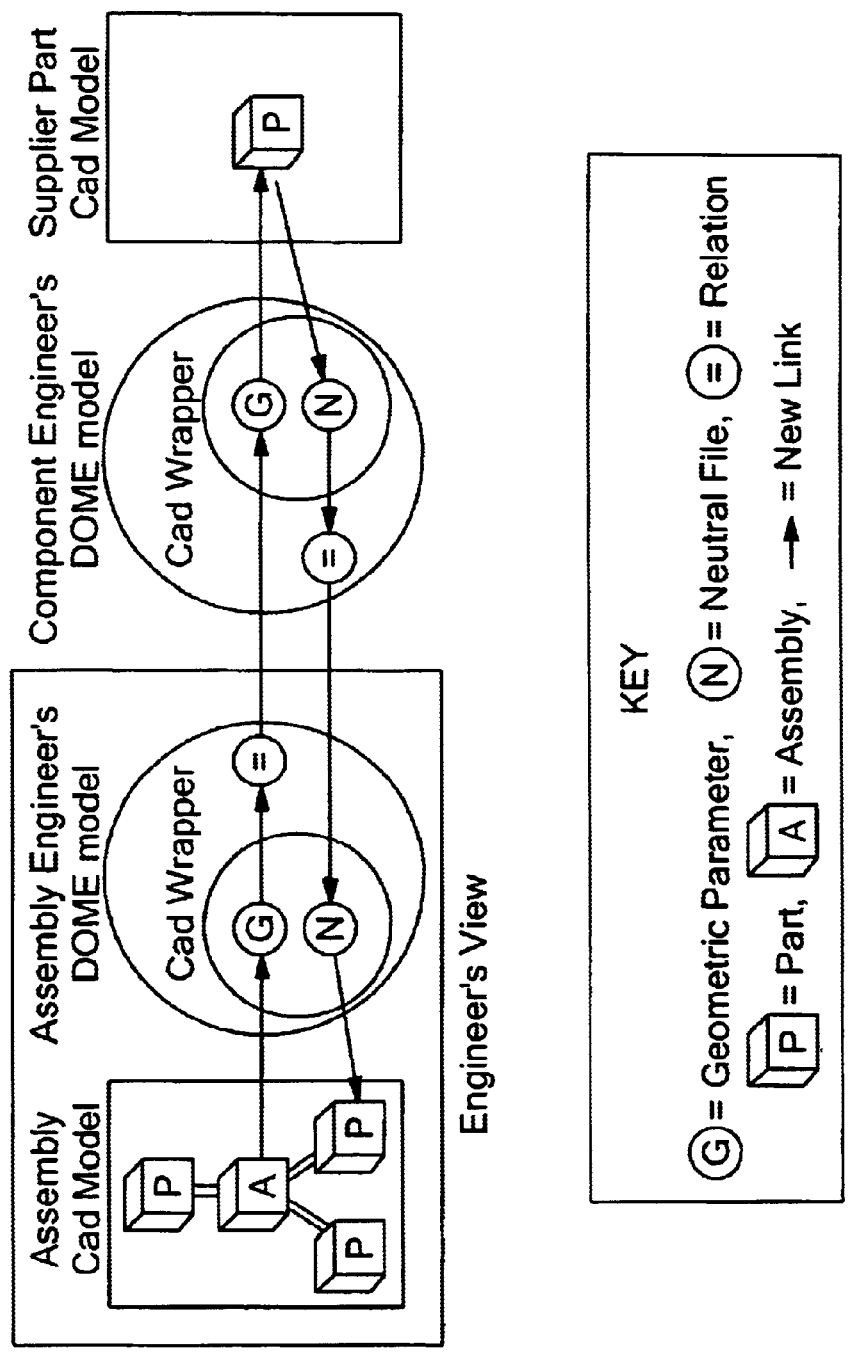
FIG. 11 is a diagram showing how a part change request travels through the service marketplace.

The engineer now has all the tools needed to build and analyze the complete assembly. The engineer's working environment now shifts back to the native CAD system or assembly environment. He imports the now locally provided version of the supplier's component neutral file and records the sequence of events needed to place the supplier part within the overall assembly as shown in FIG. 11.

While this recording process is handled differently within different CAD packages, most provide a way to record actions and then run a single command that will execute the entire set of tasks or define matching constraints between surfaces. In this case, the tasks add the imported part to the assembly and locate it properly with constraints. Other assembly tasks can also be recorded.

Figure 12:
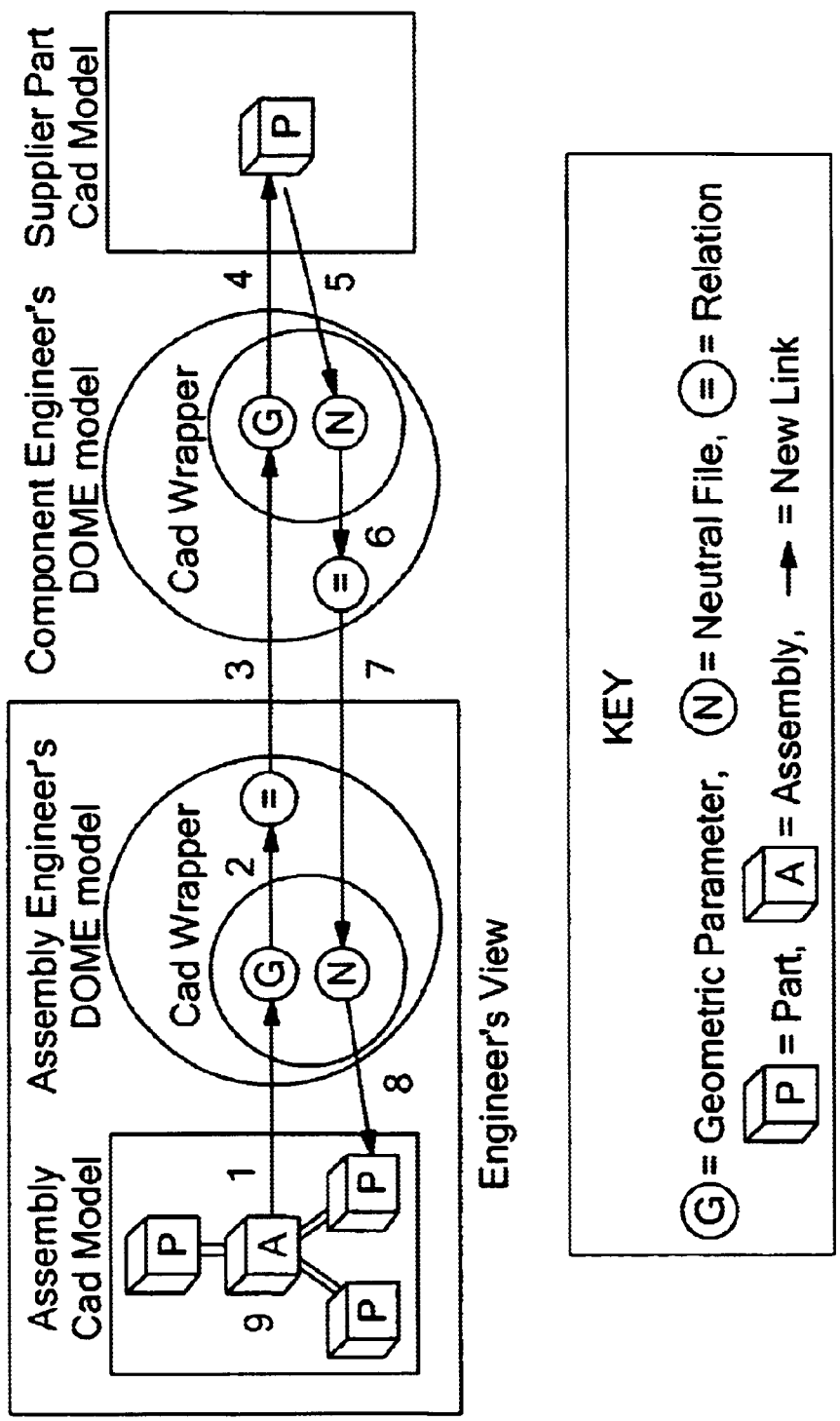
FIG. 12 is a diagram showing the steps that take place within the service marketplace.
Figure 13:
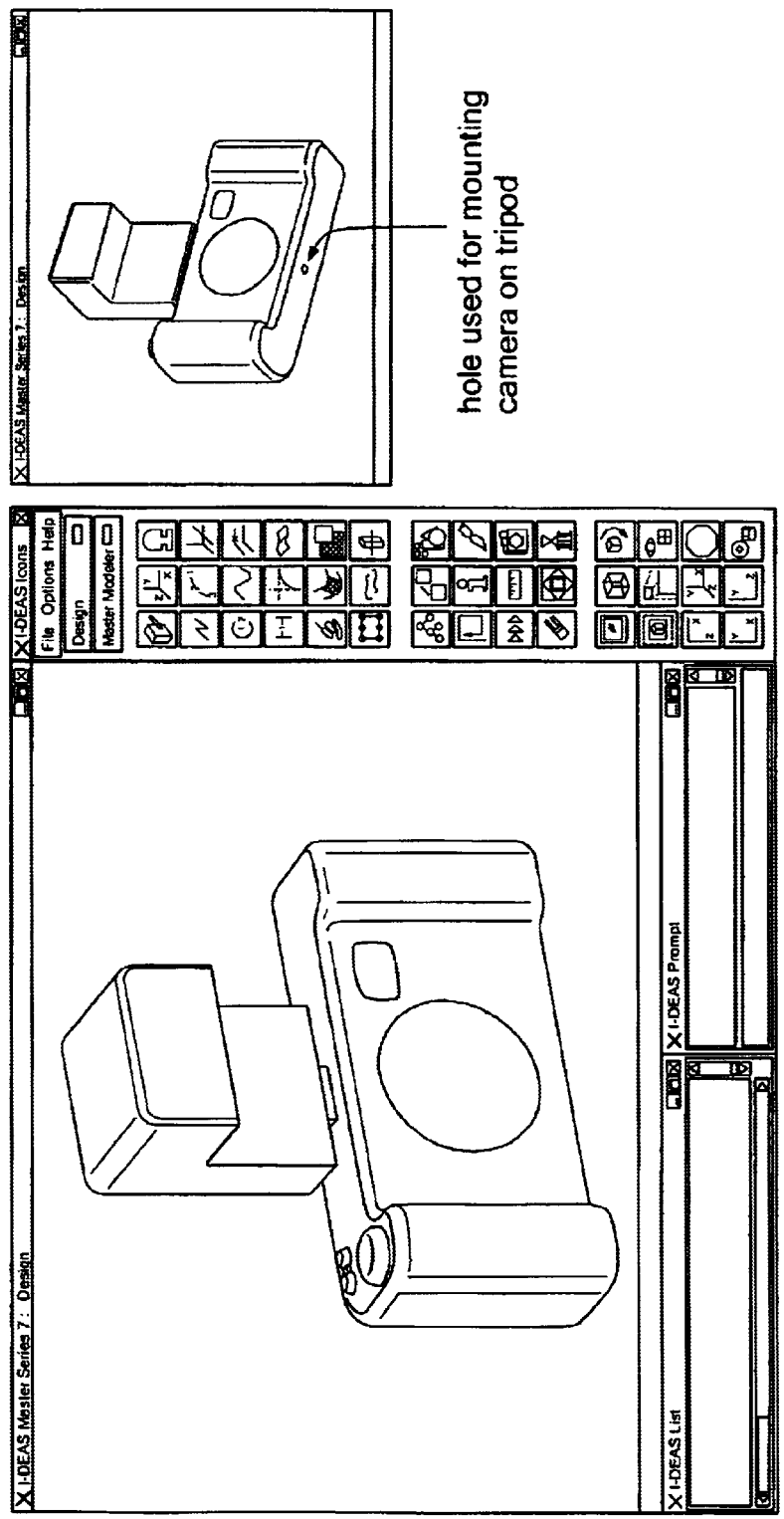
FIG. 13 is a screen shot showing an engineers model of a device.

In some scenarios the designer may request a parametric change to the part from the part provider through the service marketplace. A number of things happen automatically when the engineer makes changes to the assembly dimensions that influence input parameters to the supplier's model. This change results in the designer providing the pararmeter change to the designer service marketplace model. The change propagating through the service marketplace to the provider service marketplace model. The change is then relayed to the provider CAD model which results in the providers CAD model being rebuilt to reflect the change. The designer then receives an undated part file from the part provider through the service marketplace. The updated part file is received by the designer in a neutral file format from the provider service marketplace model which received data from the CAD model and translated the CAD model data into the neutral file format. The updated part file is incorporated into the design, which involves propagating the updated part file from said designer service marketplace model into the designer CAD model and producing a new assembly including the, updated parts file. New properties for the device are calculated from the design which now includes the updated part file. FIG. 12 illustrates the events which take place. First, the engineer's DOME alias to the supplier's component input parameters change (1). Then DOME propagates the changes to corresponding parameters in the supplier's DOME model (2). DOME objects in the supplier's model relay the new values to the supplier's underlying CAD model (3). The native CAD model rebuilds (4), and new properties are returned to the supplier's DOME model. Neutral and VRML files are also regenerated locally within the supplier's environment (5). This causes the supplier's DOME model to propagate the new neutral file to the engineer via the neutral file object (6). The new component is automatically imported into the engineer's CAD assembly (7), and the assembly configuration is recreated (8). Finally, new assembly properties can be calculated (9).

This reactive chain of data flow links the two underlying CAD simulations together such that the supplier's part attains virtual existence within the engineer's assembly. Thus, the system behaves as if the remote part were parametrically editable within the engineer's model, without actual native CAD model transfer. The supplier's detailed proprietary CAD model remains protected within their organization.

Referring now to FIGS. 13–16 a sample application involves an assembly engineer who is working for a camera manufacturer. The engineer's responsibility is to perform CAD analysis on the camera assembly using SDRC I-deas. In particular, the center of gravity for the entire assembly is used in part to determine where to place the hole for the tripod mount. Included in the assembly are native I-deas components for the main body of the camera, buttons, a view window and a flash as shown generally in FIG. 13.

Figure 14:
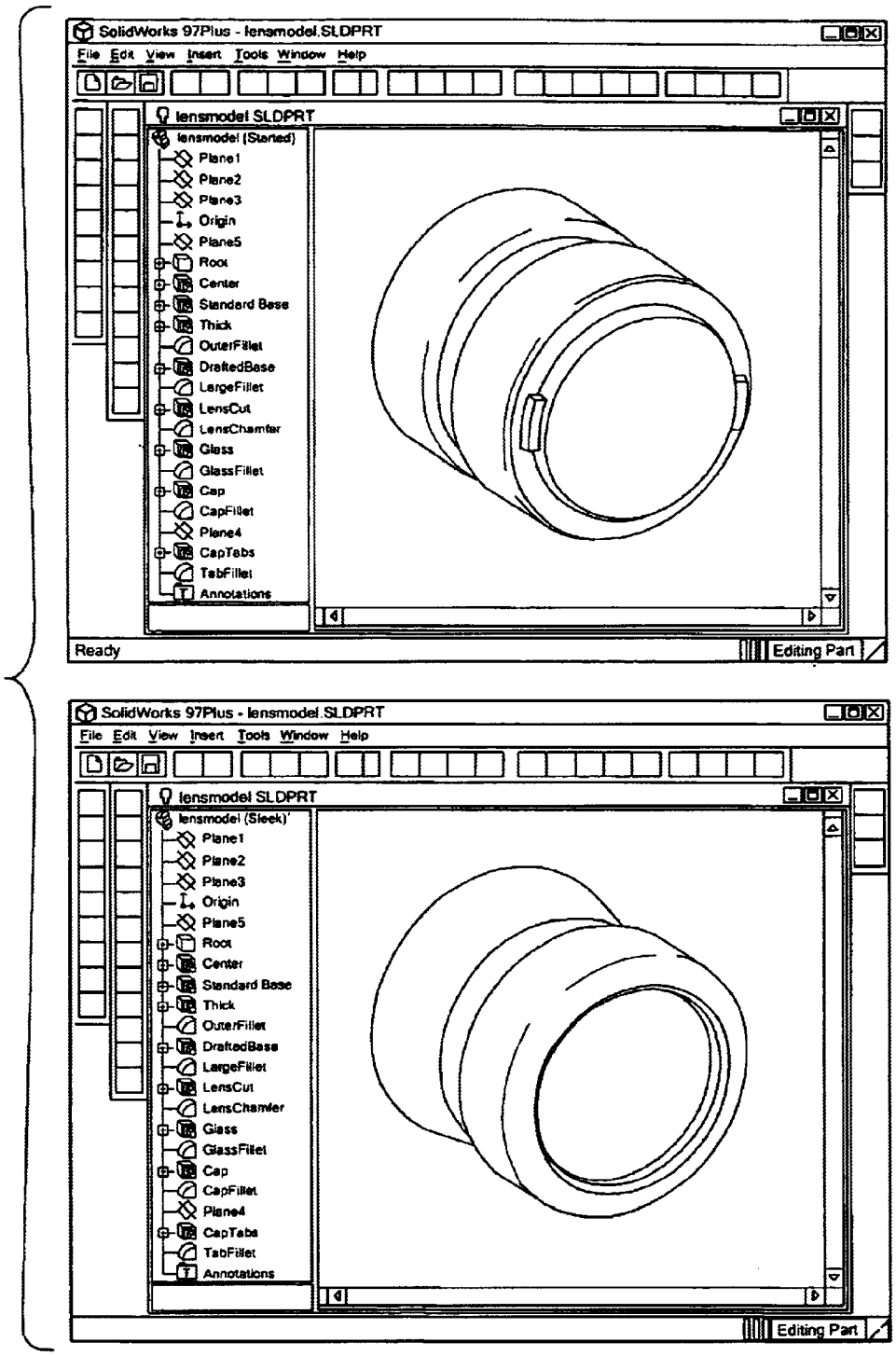
FIG. 14 is a screen shot of a providers model for a piece of the engineer's model of a device.

The lens assembly is managed by an optics CAD designer, who is modeling the lens geometry using SolidWorks as depicted in FIG. 14. The lens model allows parametric reconfiguration for different lens sizes, focal lengths, and body styles.

Figure 15:
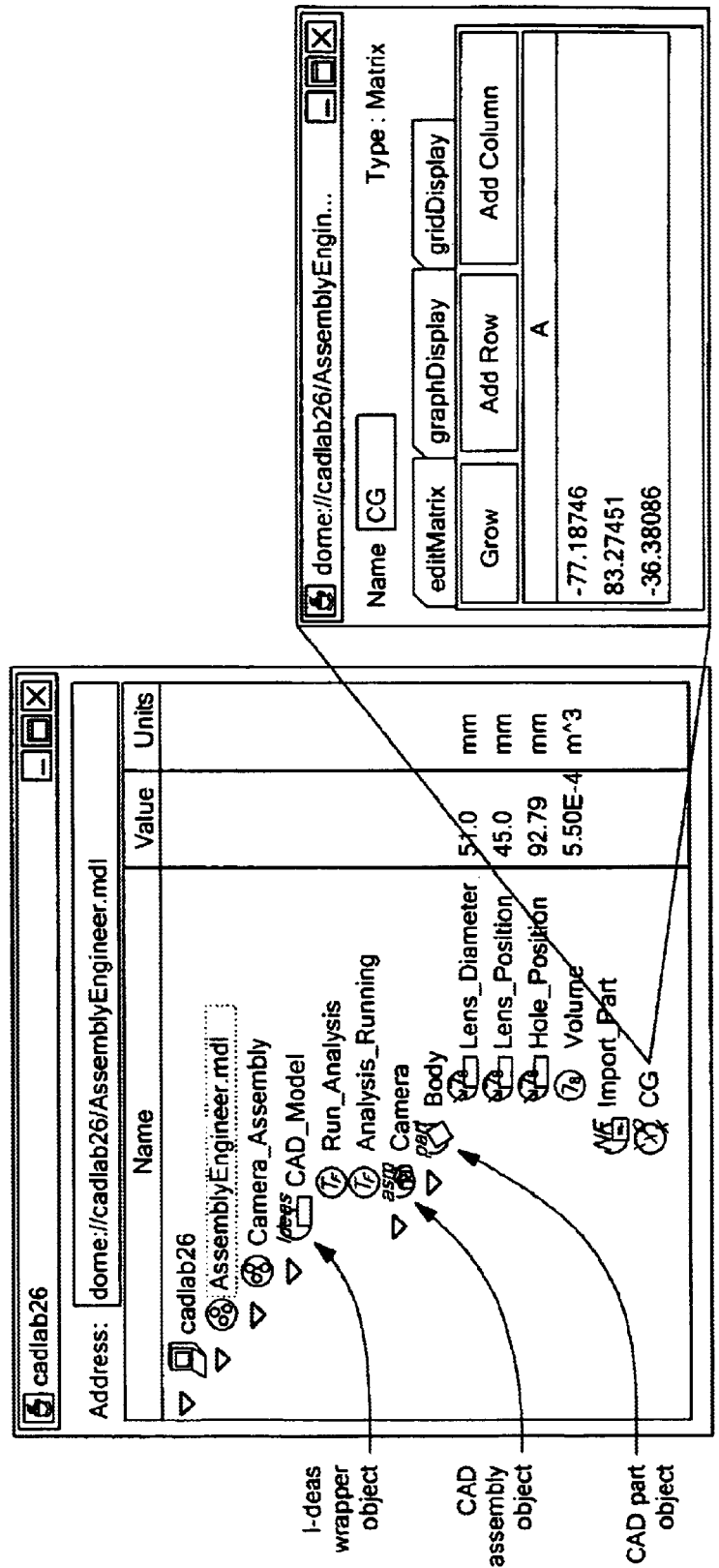
FIG. 15 is a screen shot of the DOME interface to the engineer for the device being modeled.

FIG. 15 shows the DOME interface with objects corresponding to the interface published by the assembly engineer to the I-deas CAD model. The assembly engineer has defined a neutral file object (called Import_Part) as an input to the CAD model interface. This is a placeholder for the lens, which will be provided by the optics CAD designer as either an IGES or STEP file.

Figure 16:
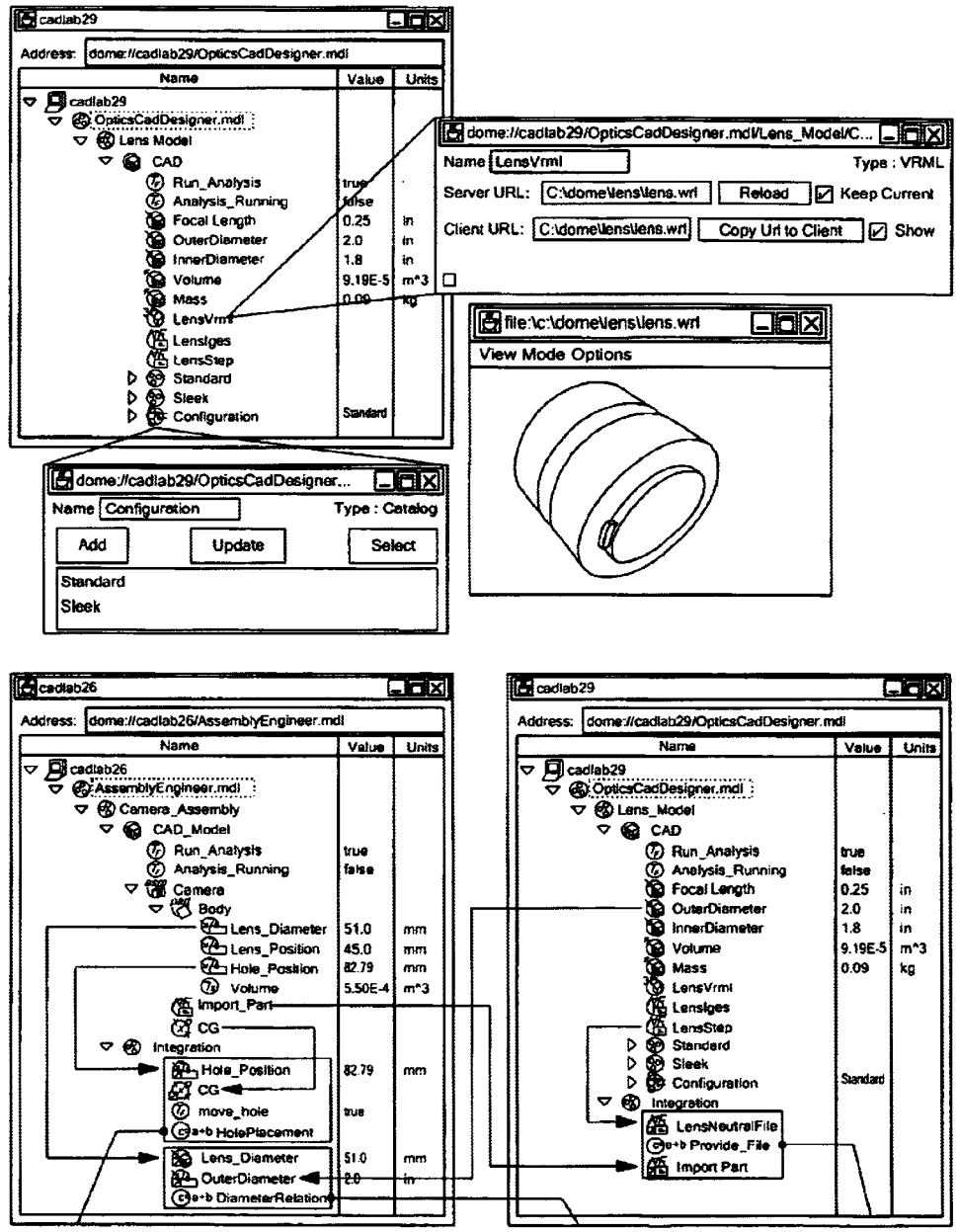
FIG. 16 shows the DOME interface for the provider's piece model.

The optics CAD designer has similarly published a DOME interface for the lens model as shown in FIG. 16. The DOME interface to the lens model allows lens parameters, such as focal length and diameter to be changed from remote locations. Using the DOME configuration catalog, the assembly engineer can make discrete changes remotely between CAD models for different lens styles. Volume, mass, and a neutral file (LensStep) are provided as output services. If the lens parameters or type are changed, the CAD model automatically rebuilds, and new properties and neutral files are provided.

The assembly engineer and the optics CAD designer have linked their models through the two DOME interfaces. The optics CAD designer has defined a relationship that will cause the assembly input Import_Part to mirror the LensStep file for the current lens configuration. The engineer has copied the lens diameter into his own model so he can control it locally. The engineer has defined relationships so that the diameter of the remote lens CAD model will mirror the diameter chosen in the I-deas assembly model, and he has also used DOME to define the tripod mount location as a function of the assembly CG.

With this system defined, the following sequence of events occurs automatically if the lens focal length is modified. A change in the FocalLength dimension in the Optics CAD designer's DOME model causes the SolidWorks model to register this new value and rebuild the lens model. Among other outputs, the neutral file service LensStep is regenerated. Its alias, LensNeutralFile, fires the relation Provide_File, which, through the alias, writes the contents of the file to the remote Import Part on the assembly engineer's DOME server. DOME notifies I-deas to remove the old lens from the assembly, import the newly created file, and reassemble the camera model. After this operation, the assembly's center of gravity is recalculated and the DOME object CG is updated, as is its alias. This change fires the relation HolePlacement, which modifies the alias dimension Hole_Position. The original dimension prompts I-deas to move this mounting hole feature accordingly, and again regenerate values for the camera's center of gravity. CG runs HolePlacement another time. If the new value for Hole_Position is significantly different that its previous value (determined by DOME), it will rebuild the I-deas model, and this smaller loop will be repeated. Otherwise, the simulation stops there.

This complete cycle requires about 60 seconds, and replaces interactions that might take several weeks following current design pratice. In this environment, the engineer and optics designer themselves used Dome to provide functional links between their models, but any other system using similar functionality might also be used for this purpose.

A CAD assembly process that combines the benefits of both tool standardization and neutral files has been proposed. Components remain parametrically controlled within the assembly model, even though they may be modeled using different CAD systems, and design history may be proprietary. CAD designers build their parametric subsystem models in the CAD system of choice. They publish appropriate service interfaces that let engineers in remote locations parametrically drive their CAD models over the Internet. Assembly designers incorporate published component neutral file services within their own CAD models. Then, when the assembly engineer makes a change to the service interface of the remote component, the remote subsystem CAD model will rebuild, and a new neutral file-based description of the component will automatically appear in the local assembly model. Thus, to the assembly engineer, the neutral file description of the component appears to allow parametric control. Allowing parts from different CAD systems on different machines to be assembled so that they respond to parametric changes automatically without revealing proprietary design history has not been implemented previously.

The concept relies upon the existence of a user driven distributed computational environment that allows designers to freely interface to their CAD models in terms of services corresponding to basic data types, such as numeric quantities, VRML, or neutral files. The distributed computational environment allows the transparent access to the services of remote models, the graphical definition of relationships between model servers, and manages the correct propagation or solving of functional relationships.

In a HAM application, the CAD assembly modeling system works as the client application, connecting to the part and subasssembly providers, typically implemented with other CAD systems, and subscribing to their services. As a parameter change request is issued by the HAM client, the part servers perform the necessary calculations, and send an updated neutral file to the client, which in turn rebuilds the assembly model. From the viewpoint of the HAM client application, the imported parts appear to permit parametric control.

For these reasons, the presently disclosed method adds a communication infrastructure to the file-based interaction. This infrastructure allows for fast and automatic control over geometry parameters, which can be accessed by all participants, and keeps track of neutral file versions. For the HAM application, this allows the assembly modeler to drive the part parameters by issuing remote requests to the part geometry provider and automatically receiving an updated neutral file back. The framework establishes a basic architecture for building collaborative environments for assembly product design, where CAD, CAM and CAAP applications can easily share geometric content.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of sharing geometric information in a collaborative design environment between a designer and at least one part provider comprising:

subscribing, by a designer and by at least one part provider, to a service marketplace;

receiving, by said designer, a part file from one of said at least one part provider, said part file containing information relating to a part;

incorporating, by said designer, said part file into a design;

requesting, by said designer, a parametric change to said part from said part provider through said service marketplace;

receiving, by said designer, an updated part file from said part provider through said service marketplace; and incorporating, by said designer, said updated part file into said design.

2. The method of claim 1 wherein said receiving a part file comprises receiving a part file in a neutral file format from a provider service marketplace model, the provider service marketplace model receiving data from a CAD model and translating said CAD model data into said neutral file format.

3. The method of claim 1 wherein the incorporating further comprises:

receiving said part file at a designer service marketplace model; and providing part information to a designer CAD model.

4. The method of claim 1 wherein said requesting further comprises:

providing a parameter change to the designer service marketplace model;

propagating the change through the service marketplace to the provider service marketplace model;

relaying the change to the provider CAD model; and rebuilding the providers CAD model.

5. The method of claim 4 wherein said receiving an updated part file comprises receiving in the designer service marketplace model an updated part file in a neutral file format from a provider service marketplace model, the provider service marketplace model receiving data from the CAD model and translating said CAD model data into said neutral file format.

6. The method of claim 5 wherein said incorporating comprises propagating said updates part file from said designer service marketplace model into the designer CAD model and producing a new assembly including said updated parts file.

7. The method of claim 1 further comprising calculating new properties from said design including said updated part file.

8. The method of claim 1 wherein said steps of receiving a part file and receiving an updated part file are performed across a network.

9. The method of claim 8 wherein said network comprises the Internet.

* * * * *

UNITED STATES PATENT AND TRADEMARK OFFICE
CERTIFICATE OF CORRECTION

PATENT NO. : 6,782,305 B2
DATED : August 24, 2004
INVENTOR(S) : Liteplo et al.

It is certified that error appears in the above-identified patent and that said Letters Patent is hereby corrected as shown below:

Title page,
Item [57], ABSTRACT,
Line 5, delete "Internet based" and replace with -- Internet-based --.
Line 8, delete "embodiment the" and replace with -- embodiment, the --.

Column 3,
Line 51, delete "request the" and replace with -- request, the --.

Column 4,
Lines 64-65, delete "Internet based" and replace with -- Internet-based --.
Line 67, delete "embodiment the" and replace with -- embodiment, the --.

Column 5,
Lines 19 and 34, delete "engineers" and replace with -- engineer's --.

Column 6,
Line 4, delete "stated the" and replace with -- stated, the --.
Line 12, delete "select" and replace with -- selects --.
Line 14, delete "establishing and maintaining" and replace with -- establish and maintain --.
Line 28, delete "internet" and replace with -- Internet --.

Column 7,
Line 6, delete "20 the" and replace with -- 20, the --.
Line 12, delete "workspace they" and replace with -- workspace, they --.
Line 39, delete "server a" and replace with -- server, a --.
Line 45, delete "6 the" and replace with -- 6, the --.
Line 49, delete "that that integrator's" and replace with -- that the integrator's --.
Line 50, delete the first occurrence of the word "be".

Column 8,
Line 11, delete "environment the" and replace with -- environment, the --.
Line 16, delete "FIG. 7 the" and replace with -- FIG. 7, the --.
Line 28, delete "are been" and replace with -- have been --.
Line 30, delete "50 anyone" and replace with -- 50, anyone --.

Column 9,
Line 27, delete "model. The" and replace with -- model, the --.
Line 41, delete "the, updated" and replace with -- the updated --.
Line 66, delete "FIGS. 13-16 a" and replace with -- FIGS. 13-16, a --.

UNITED STATES PATENT AND TRADEMARK OFFICE
CERTIFICATE OF CORRECTION

PATENT NO. : 6,782,305 B2
DATED : August 24, 2004
INVENTOR(S) : Liteplo et al.

It is certified that error appears in the above-identified patent and that said Letters Patent is hereby corrected as shown below:

Column 10,
Line 50, delete "Import Part" and replace with -- Import_Part --.

Column 11,
Line 19, delete "subsystem" and replace with -- sub-system --.
Line 38, delete "subassembly" and replace with -- sub-assembly --.
Lines 57-58, delete "invention it" and replace with -- invention, it --.

Column 12,
Line 4, delete "that that the invention" and replace with -- that the invention --.

Signed and Sealed this

Twenty-sixth Day of July, 2005

JON W. DUDAS
*Director of the United States Patent and Trademark Office*